(12) United States Patent
Hatakeyama et al.

(10) Patent No.: US 11,874,020 B2
(45) Date of Patent: Jan. 16, 2024

(54) MOTOR DRIVE APPARATUS, BLOWER, COMPRESSOR, AND AIR CONDITIONER

(71) Applicant: Mitsubishi Electric Corporation, Tokyo (JP)

(72) Inventors: Kazunori Hatakeyama, Tokyo (JP); Keisuke Uemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 236 days.

(21) Appl. No.: 17/617,971

(22) PCT Filed: Aug. 30, 2019

(86) PCT No.: PCT/JP2019/034259
§ 371 (c)(1),
(2) Date: Dec. 10, 2021

(87) PCT Pub. No.: WO2021/038865
PCT Pub. Date: Mar. 4, 2021

(65) Prior Publication Data
US 2022/0252283 A1    Aug. 11, 2022

(51) Int. Cl.
*H02P 27/08*         (2006.01)
*H02M 3/158*         (2006.01)
(Continued)

(52) U.S. Cl.
CPC .............. *F24F 5/001* (2013.01); *H02K 7/14* (2013.01); *H02M 3/158* (2013.01); *H02M 7/5387* (2013.01); *H02P 27/08* (2013.01)

(58) Field of Classification Search
CPC ... H02P 27/08; H02M 3/158; H02M 7/53871; H02M 5/4585; F24F 5/001; H02K 7/14
See application file for complete search history.

(56) References Cited

U.S. PATENT DOCUMENTS 4,193,111 A * 3/1980 Wester ............... H02M 1/10
                                                  363/126
4,964,029 A * 10/1990 Severinsky ........ H02M 3/1582
                                                  323/224
(Continued)

FOREIGN PATENT DOCUMENTS

JP    H10-174477 A    6/1998
JP    2015-130759 A   7/2015
(Continued)

OTHER PUBLICATIONS

International Search Report dated Nov. 12, 2019, issued in corresponding International Patent Application No. PCT/JP2019/034259.

*Primary Examiner* — Thai T Dinh
(74) *Attorney, Agent, or Firm* — POSZ LAW GROUP, PLC

(57) ABSTRACT

A motor drive apparatus includes a reactor, a converter connected to an alternating current power supply via the reactor, a smoothing capacitor connected between output terminals of the converter, and an inverter that converts a direct current voltage output from the smoothing capacitor into an alternating current voltage to be applied to a motor and outputs the alternating current voltage. The motor drive apparatus includes a plurality of operation modes for controlling conduction of switching elements of the converter and causing the converter to operate in different modes of operation, and changes operation of at least one of the switching elements of the converter and the inverter according to the operation mode when a bus voltage indicates an excessive value.

12 Claims, 10 Drawing Sheets

(51) Int. Cl.
H02M 7/5387 (2007.01)
H02K 7/14 (2006.01)
F24F 5/00 (2006.01)

(56) References Cited

U.S. PATENT DOCUMENTS

| | | | | |
|---|---|---|---|---|
| 5,019,952 A | * | 5/1991 | Smolenski | H02M 3/156 363/124 |
| 5,233,509 A | * | 8/1993 | Ghotbi | H02M 7/219 363/80 |
| 10,312,800 B2 | * | 6/2019 | Yamada | H02M 1/4225 |

FOREIGN PATENT DOCUMENTS

| | | |
|---|---|---|
| JP | 2017-055581 A | 3/2017 |
| WO | 2020066034 A1 | 4/2020 |

* cited by examiner

| OPERATION MODE | SYNCHRO-NOUS RECTIFICA-TION | CURRENT CONTROL | BUS VOLTAGE CONTROL |
|---|---|---|---|
| (a)RECTIFICATION MODE | NO | NO | NO |
| (b)SYNCHRONOUS RECTIFICATION MODE | YES | NO | NO |
| (c)LOW-SPEED SWITCHING MODE | YES/NO | YES(LOW RESPONSE)/NO | YES |
| (d)HIGH-SPEED SWITCHING MODE | YES/NO | YES(HIGH RESPONSE) | YES |

… …

MOTOR DRIVE APPARATUS, BLOWER, COMPRESSOR, AND AIR CONDITIONER

CROSS REFERENCE TO RELATED APPLICATION

This application is a U.S. National Stage Application of International Patent No. PCT/JP2019/034259 filed on Aug. 30, 2019, the disclosure of which is incorporated herein by reference.

TECHNICAL FIELD

The present invention relates to a motor drive apparatus for driving a motor, a blower and a compressor each including the motor drive apparatus, and an air conditioner including the blower or the compressor.

BACKGROUND

A motor drive apparatus includes a converter that converts an alternating current voltage output from an alternating current power supply into a direct current voltage, and an inverter that converts a direct current voltage into an alternating current voltage. In the motor drive apparatus, an increase in a bus voltage that is a voltage of a direct current bus connecting the converter and the inverter may become a problem. A fluctuation of the bus voltage can occur due to a sudden fluctuation of a load.

Patent Literature 1 below discloses a power conversion device used for a heat pump refrigeration cycle. In the heat pump refrigeration cycle, when a passage of a four-way valve is switched, a high pressure side and a low pressure side in the refrigeration cycle are switched. At this time, the pressure applied to a compressor motor fluctuates greatly, and the load of an inverter suddenly decreases. With the sudden decrease in the load, the bus voltage may increase anomalously and exceed the withstand voltage of a smoothing capacitor. Therefore, in Patent Literature 1, when the four-way valve is switched, the switching operation of a converter is stopped so that the voltage of the smoothing capacitor does not exceed the withstand voltage.

PATENT LITERATURE

Patent Literature 1: Japanese Patent Application Laid-open No. 2015-130759

In general, the response time of an electrical characteristic of the converter is on the order of several milliseconds, whereas the response time of a mechanical characteristic of the refrigeration cycle is on the order of several seconds. That is, the response time of the mechanical characteristic of the refrigeration cycle is sufficiently slower than the response time of the electrical characteristic of the converter. Therefore, the converter generally has a fast response time for the load fluctuation of the refrigeration cycle when the four-way valve is switched, thereby being able to deal with this type of load fluctuation.

SUMMARY

On the other hand, in the power conversion device described in Patent Literature 1, the switching operation of the converter is stopped when the four-way valve is switched, as described above. The reason for this is thought to be that, in the power conversion device assumed in Patent Literature 1, a control system of the power conversion device is set to have response performance that does not allow a sufficient response to the load fluctuation of the refrigeration cycle. Moreover, the load fluctuation is assumed not only when the four-way valve is switched but also when a compressor motor falls out of step or is locked and stopped. The load of the inverter is lost instantaneously in the case where such a load fluctuation occurs as well. In this case, when the converter operates as a boost converter, energy for boosting remains without being consumed. Therefore, in the case of a control system with low response performance, the bus voltage may become excessive due to the load fluctuation.

The present invention has been made in view of the above, and an object of the present invention is to provide a motor drive apparatus capable of reducing an increase in a bus voltage due to a load fluctuation.

In order to solve the above problem and achieve the object, a motor drive apparatus according to the present invention includes: a reactor; a converter including four unidirectional elements that are bridge-connected, the converter being connected to an alternating current power supply via the reactor; a smoothing capacitor connected between output terminals of the converter; and an inverter converting a direct current voltage output from the smoothing capacitor into an alternating current voltage to be applied to a motor, and outputting the alternating current voltage. The motor drive apparatus further includes a physical quantity detection unit detecting a physical quantity representing an operating state on an output side of the converter. In the converter, two of the four unidirectional elements are connected in series and form a first leg, and remaining two of the unidirectional elements are connected in series and form a second leg. A switching element is connected in parallel to at least each of two unidirectional elements in the first and second legs connected to a positive side of the smoothing capacitor, two unidirectional elements in the first and second legs connected to a negative side of the smoothing capacitor, the two unidirectional elements in the first leg, or the two unidirectional elements in the second leg. The motor drive apparatus includes a plurality of operation modes for controlling conduction of the switching element and causing the converter to operate in different modes of operation, and changes operation of at least one of the switching element and the inverter according to the operation mode when the physical quantity indicates an excessive value.

The motor drive apparatus according to the present invention produces an effect whereby an increase in the bus voltage due to the load fluctuation can be reduced.

DETAILED DESCRIPTION

A motor drive apparatus, a blower, a compressor, and an air conditioner according to embodiments of the present invention will now be described with reference to the accompanying drawings. Note that the present invention is not limited by the following embodiments. Moreover, an electrical connection will be simply referred to as a "connection" in the following description.

First Embodiment

Figure 1:
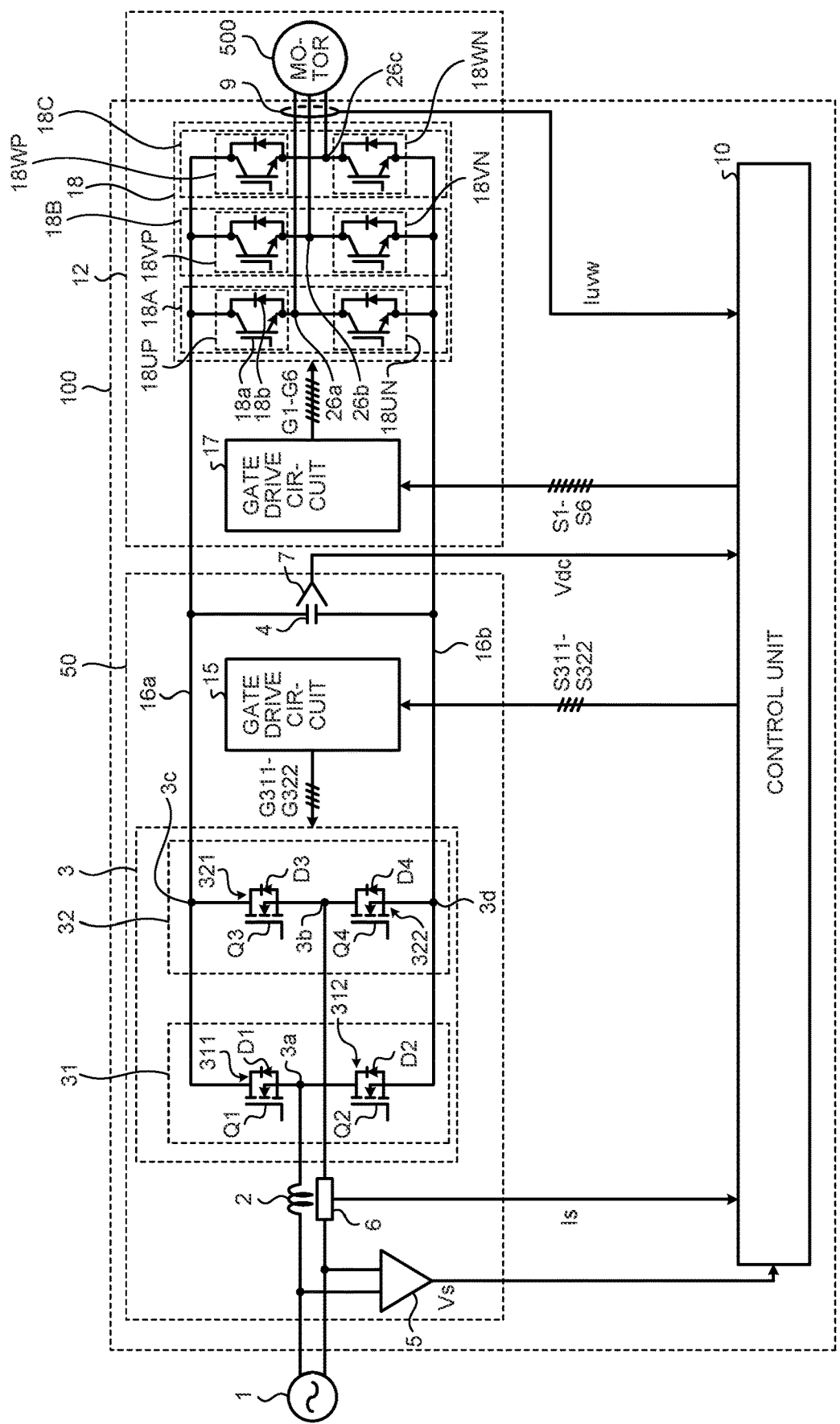
FIG. 1 is a diagram illustrating an example of a configuration of a motor drive apparatus according to a first embodiment.

FIG. 1 is a diagram illustrating an example of a configuration of a motor drive apparatus 100 according to a first embodiment. The motor drive apparatus 100 according to the first embodiment is a drive apparatus that converts alternating current power supplied from a single-phase alternating current power supply 1 into direct current power, converts the direct current power obtained by the conversion into alternating current power again, and supplies the alternating current power obtained by the conversion to a motor 500 to drive the motor 500.

As illustrated in FIG. 1, the motor drive apparatus 100 according to the first embodiment includes a direct current power supply device 50, a control unit 10, and an inverter 18 as main components. The direct current power supply device 50 is a power supply device that converts the alternating current power supplied from the single-phase alternating current power supply 1 into the direct current power.

The direct current power supply device 50 includes a reactor 2, a converter 3, a gate drive circuit 15 as a first drive circuit, a smoothing capacitor 4, a voltage detection unit 5 as a first voltage detection unit, a current detection unit 6 as a first current detection unit, and a voltage detection unit 7 as a second voltage detection unit. One end of the reactor 2 is connected to the alternating current power supply 1, and the other end of the reactor 2 is connected to the converter 3. The reactor 2 temporarily stores the power supplied from the alternating current power supply 1. The converter 3 converts an alternating current voltage output from the alternating current power supply 1 into a direct current voltage, and outputs the direct current voltage to direct current buses 16a and 16b. The voltage between the direct current bus 16a and the direct current bus 16b is a bus voltage.

A load 12 includes a gate drive circuit 17 as a second drive circuit, an inverter 18, a current detection unit 9 as a second current detection unit, and the motor 500. Among the components of the load 12, the gate drive circuit 17, the inverter 18, and the current detection unit 9 excluding the motor 500 are the components of the motor drive apparatus 100. The inverter 18 converts the direct current voltage output from the direct current power supply device 50 into an alternating current voltage to be applied to the motor 500, and outputs the alternating current voltage. An example of an apparatus on which the motor 500 is installed is a blower, a compressor, or an air conditioner.

Note that the current detection unit 9 is a detection unit that detects a motor current being an alternating current flowing between the inverter 18 and the motor 500. Instead of the configuration for detecting the motor current, a configuration for detecting the current flowing through the direct current buses 16a and 16b connecting the inverter 18 and the smoothing capacitor 4 may be adopted. Moreover, although FIG. 1 illustrates the example in which the device connected to the inverter 18 is the motor 500, this is not a limitation. The device connected to the inverter 18 may be any device to which the alternating current power is input, and may be a device other than the motor 500.

The converter 3 includes a first leg 31 and a second leg 32. The first leg 31 and the second leg 32 are connected in parallel. In the first leg 31, a first upper arm element 311 and a first lower arm element 312 are connected in series. In the second leg 32, a second upper arm element 321 and a second lower arm element 322 are connected in series. The other end of the reactor 2 is connected to a connection point 3a between the first upper arm element 311 and the first lower arm element 312 of the first leg 31. A connection point 3b between the second upper arm element 321 and the second lower arm element 322 is connected to the other end of the alternating current power supply 1. In the converter 3, the connection points 3a and 3b form alternating current terminals.

Note that in FIG. 1, the reactor 2 is connected between one end of the alternating current power supply 1 and the connection point 3a, but may be connected between another end of the alternating current power supply 1 and the connection point 3b.

In the converter 3, the side corresponding to the connection points 3a and 3b is referred to as an "alternating current side". Moreover, the alternating current voltage output from the alternating current power supply 1 is referred to as a "power supply voltage", and the cycle of the power supply voltage is referred to as a "power supply cycle".

The first upper arm element 311 includes a switching element Q1 and a diode D1 connected in parallel to the switching element Q1. The first lower arm element 312 includes a switching element Q2 and a diode D2 connected in parallel to the switching element Q2. The second upper arm element 321 includes a switching element Q3 and a diode D3 connected in parallel to the switching element Q3. The second lower arm element 322 includes a switching element Q4 and a diode D4 connected in parallel to the switching element Q4.

The diodes D1 and D4 are unidirectional elements disposed such that a forward current flows when the polarity of the power supply voltage is positive, that is, when the side connected to the reactor 2 has a higher potential than the side not connected to the reactor 2. The diodes D2 and D3 are unidirectional elements disposed such that a forward current flows when the polarity of the power supply voltage is negative, that is, when the side not connected to the reactor 2 has a higher potential than the side connected to the reactor 2.

Note that although FIG. 1 discloses the configuration in which the switching elements Q1, Q2, Q3, and Q4 are connected in parallel to the diodes D1, D2, D3, and D4, respectively, the configuration is not limited thereto. It is sufficient if a switching element is connected to each of the two diodes connected to the positive side of the smoothing capacitor 4, that is, the diode D1 in the first leg 31 and the diode D3 in the second leg 32. Alternatively, it is sufficient if a switching element is connected to each of the two diodes connected to the negative side of the smoothing capacitor 4, that is, the diode D2 in the first leg 31 and the diode D4 in the second leg 32. Yet alternatively, it is sufficient if a switching element is connected to each of the two diodes in the first leg 31, that is, the diodes D1 and D2. Still alternatively, it is sufficient if a switching element is connected to each of the two diodes in the second leg 32, that is, the diodes D3 and D4.

Moreover, FIG. 1 illustrates the MOSFET for each of the switching elements Q1, Q2, Q3, and Q4 as an example, but the switching elements are not limited to the MOSFET. The MOSFET is a switching element capable of causing a current to flow bidirectionally between a drain and a source. Any switching element may be used as long as it is a switching element capable of causing a current to flow bidirectionally between a first terminal corresponding to the drain and a second terminal corresponding to the source, that is, a bidirectional element.

Moreover, "parallel" in this case means that the first terminal corresponding to the drain of the MOSFET and a cathode of the diode are connected, and the second terminal corresponding to the source of the MOSFET and an anode of the diode are connected. Note that a parasitic diode included in the MOSFET itself may be used as the diode. The parasitic diode is also referred to as a body diode.

Moreover, the switching elements Q1, Q2, Q3, and Q4 are not limited to a MOSFET formed of a silicon-based material, and may be a MOSFET formed of a wide band gap (WBG) semiconductor such as silicon carbide, gallium nitride, gallium oxide, or diamond.

The WBG semiconductor generally has higher withstand voltage and heat resistance than the silicon semiconductor. Therefore, the use of the WBG semiconductor for at least one of the switching elements Q1, Q2, Q3, and Q4 increases the withstand voltage and the allowable current density of the switching element, and a semiconductor module incorporating the switching element can be downsized.

Alternatively, as the switching elements Q1, Q2, Q3, and Q4, a MOSFET having a super junction (SJ) structure may be used instead of the WBG semiconductor. The use of the SJ-MOSFET can avoid a disadvantage of the WBG semiconductor that the capacitance is high and recovery is likely to occur while making use of low on-resistance which is an advantage of the SJ-MOSFET.

The description refers back to FIG. 1. The positive side of the smoothing capacitor 4 is connected to the direct current bus 16a on the high potential side. The direct current bus 16a is drawn from a connection point 3c between the first upper arm element 311 in the first leg 31 and the second upper arm element 321 in the second leg 32. The negative side of the smoothing capacitor 4 is connected to the direct current bus 16b on the low potential side. The direct current bus 16b is drawn from a connection point 3d between the first lower arm element 312 in the first leg 31 and the second lower arm element 322 in the second leg 32. In the converter 3, the connection points 3c and 3d form direct current terminals. Also in the converter 3, the side corresponding to the connection points 3c and 3d is referred to as a "direct current side" in some cases.

The output voltage of the converter 3 is applied across the smoothing capacitor 4. The smoothing capacitor 4 is connected to the direct current buses 16a and 16b. The smoothing capacitor 4 smooths the output voltage of the converter 3. The voltage smoothed by the smoothing capacitor 4 is applied to the inverter 18.

The voltage detection unit 5 detects the power supply voltage, and outputs a detected value Vs of the power supply voltage to the control unit 10. The power supply voltage is an absolute value of an instantaneous voltage of the alternating current power supply 1. Note that the power supply voltage may be a root mean square value of the instantaneous voltage. The current detection unit 6 detects a power supply current that is an alternating current flowing between the alternating current power supply 1 and the converter 3, and outputs a detected value Is of the power supply current to the control unit 10. An example of the current detection unit 6 is a current transformer (CT). The voltage detection unit 7 detects the bus voltage and outputs a detected value Vdc of the bus voltage to the control unit 10.

The bus voltage is a physical quantity representing an operating state on the direct current side of the converter 3, that is, the output side thereof. Moreover, the power supply voltage is a physical quantity representing an operating state on the alternating current side of the converter 3, that is, the input side thereof. Note that in the following description, the bus voltage may be referred to as a "physical quantity", and the voltage detection unit 7 that detects the bus voltage may be referred to as a "physical quantity detection unit".

The inverter 18 includes a leg 18A in which an upper arm element 18UP and a lower arm element 18UN are connected in series, a leg 18B in which an upper arm element 18VP and a lower arm element 18VN are connected in series, and a leg 18C in which an upper arm element 18WP and a lower arm element 18WN are connected in series. The legs 18A, 18B, and 18C are connected in parallel to one another.

FIG. 1 illustrates a case where the upper arm elements 18UP, 18VP, and 18WP and the lower arm elements 18UN, 18VN, and 18WN are insulated gate bipolar transistors (IGBTs) as an example, but this is not a limitation. Instead of the IGBT, a MOSFET or an integrated gate commutated thyristor (IGCT) may be used.

The upper arm element 18UP includes a transistor 18a and a diode 18b connected in parallel to the transistor 18a. The other upper arm elements 18VP and 18WP and the lower arm elements 18UN, 18VN, and 18WN each have a similar configuration. The term "parallel" in this case means that the anode side of the diode is connected to a first terminal corresponding to the emitter of the IGBT, and the cathode side of the diode is connected to a second terminal corresponding to the collector of the IGBT.

Note that FIG. 1 illustrates the configuration including the three legs in each of which the upper arm element and the lower arm element are connected in series, but this configuration is not a limitation. The number of legs may be four or more. Moreover, the circuit configuration illustrated in FIG. 1 is adapted to the motor 500 that is a three-phase motor. In a case where the motor 500 is a single-phase motor, the inverter 18 also has a configuration corresponding to the single-phase motor. Specifically, the inverter has a configuration including two legs in each of which the upper arm element and the lower arm element are connected in series.

Note that in either case where the motor 500 is a single-phase motor or a three-phase motor, one leg may include a plurality of pairs of upper and lower arm elements.

When the transistors 18a of the upper arm elements 18UP, 18VP, and 18WP and the lower arm elements 18UN, 18VN, and 18WN are MOSFETs, the upper arm elements 18UP, 18VP, and 18WP and the lower arm elements 18UN, 18VN, and 18WN may be formed of a WBG semiconductor such as silicon carbide, a gallium nitride-based material, or diamond. When the MOSFET formed of the WBG semiconductor is used, the effects of withstand voltage and heat resistance can be obtained.

A connection point 26a between the upper arm element 18UP and the lower arm element 18UN is connected to a first phase (for example, a U phase) of the motor 500, a connection point 26b between the upper arm element 18VP and the lower arm element 18VN is connected to a second phase (for example, a V phase) of the motor 500, and a connection point 26c between the upper arm element 18WP and the lower arm element 18WN is connected to a third phase (for example, a W phase) of the motor 500. In the inverter 18, the connection points 26a, 26b, and 26c form alternating current terminals.

The current detection unit 9 detects a motor current flowing between the inverter 18 and the motor 500, and outputs a detected value Iuvw of the motor current to the control unit 10.

The control unit 10 generates control signals S311 to S322 for controlling the corresponding switching elements in the converter 3 on the basis of the detected value Vs of the voltage detection unit 5, the detected value Is of the current detection unit 6, and the detected value Vdc of the voltage detection unit 7. The control signal S311 is a control signal for controlling the switching element Q1, and the control signal S322 is a control signal for controlling the switching element Q4. The switching elements Q2 and Q3 are also controlled by the control signals from the control unit 10. Hereinafter, the operation of the arm elements according to the control signals S311 to S322 is referred to as a "switching operation" as appropriate. The control signals S311 to S322 generated by the control unit 10 are input to the gate drive circuit 15.

Moreover, on the basis of the detected value Vdc of the voltage detection unit 7 and the detected value Iuvw of the current detection unit 9, the control unit 10 generates control signals S1 to S6 for controlling the corresponding switching elements included in the inverter 18 such that the motor 500 rotates at a desired rotational speed. The inverter 18 has the three-phase circuit configuration, and has six switching elements corresponding to the three-phase circuit configuration. Also, the six control signals S1 to S6 are generated corresponding to the six switching elements. The control signals S1 to S6 generated by the control unit 10 are input to the gate drive circuit 17.

The gate drive circuit 15 generates drive pulses G311 to G322 for driving the switching elements in the converter 3 on the basis of the control signals S311 to S322. The drive pulse G311 is a drive pulse for driving the switching element Q1, and the drive pulse G322 is a drive pulse for driving the switching element Q4. The switching elements Q2 and Q3 are also driven by the drive pulses from the gate drive circuit 15.

The gate drive circuit 17 generates drive pulses G1 to G6 for driving the switching elements in the inverter 18 on the basis of the control signals S1 to S6.

Next, a basic operation of the motor drive apparatus 100 according to the first embodiment will be described. First, in the first leg 31, the first upper arm element 311 and the first lower arm element 312 operate so as not to be complementarily or simultaneously turned on. That is, when one of the first upper arm element 311 and the first lower arm element 312 is on, the other is off. As described above, the first upper arm element 311 and the first lower arm element 312 are controlled by the control signals S311 and S312 generated by the control unit 10. An example of the control signals S311 and S312 is a pulse width modulation (PWM) signal.

In order to prevent a short circuit of the smoothing capacitor 4 via the alternating current power supply 1 and the reactor 2, both the first upper arm element 311 and the first lower arm element 312 are turned off when an absolute value of the detected value Is of the power supply current output from the alternating current power supply 1 is less than or equal to a current threshold. Hereinafter, the short circuit of the smoothing capacitor 4 is referred to as a "capacitor short circuit". The capacitor short circuit is a state in which the energy stored in the smoothing capacitor 4 is released so that the current is regenerated to the alternating current power supply 1.

As described above, the second upper arm element 321 and the second lower arm element 322 included in the second leg 32 are controlled by the control signals S321 and S322 generated by the control unit 10. The second upper arm element 321 and the second lower arm element 322 are basically turned on or off according to the power supply voltage polarity that is the polarity of the power supply voltage. Specifically, when the power supply voltage polarity is positive, the second lower arm element 322 is on, and the second upper arm element 321 is off. When the power supply voltage polarity is negative, the second upper arm element 321 is on, and the second lower arm element 322 is off.

Next, a relationship between a state of each arm element of the converter 3 in the first embodiment and a path of the current flowing through the motor drive apparatus 100 according to the first embodiment will be described. Note that the following description assumes that each arm element of the converter 3 is a MOSFET, and the diode of each arm element is a parasitic diode included in the MOSFET itself.

Figure 2:
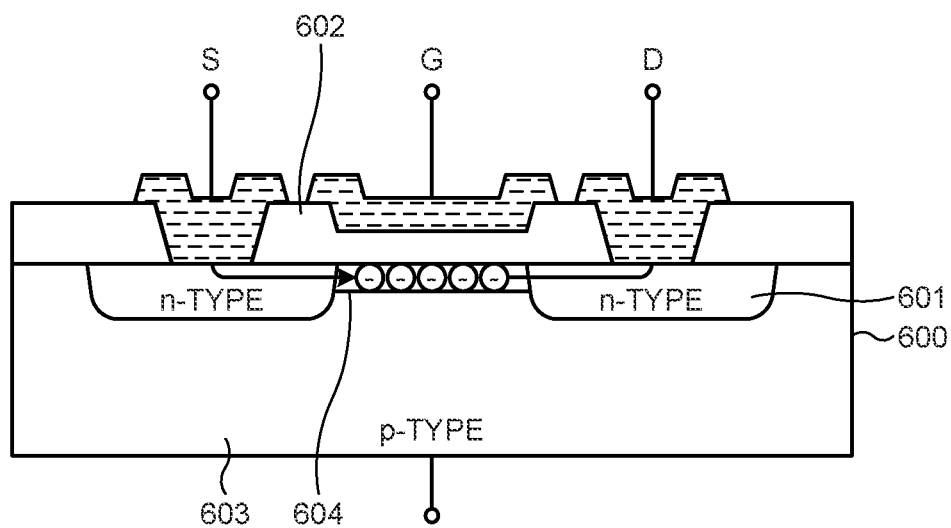
FIG. 2 is a schematic cross-sectional view illustrating a schematic structure of a metal oxide semiconductor field effect transistor (MOSFET) used in a converter of the first embodiment.

First, a structure of the MOSFET will be described with reference to FIG. 2. FIG. 2 is a schematic cross-sectional view illustrating a schematic structure of the MOSFET used in the converter 3 of the first embodiment. FIG. 2 illustrates an n-type MOSFET as an example.

In the case of the n-type MOSFET, a p-type semiconductor substrate 600 is used as illustrated in FIG. 2. A source electrode S, a drain electrode D, and a gate electrode G are formed on the semiconductor substrate 600. Portions in contact with the source electrode S and the drain electrode D are subjected to ion implantation of high-concentration impurities to form n-type regions 601. Moreover, an oxide insulating film 602 is formed between a portion where the n-type region 601 is not formed in the semiconductor substrate 600 and the gate electrode G. That is, the oxide insulating film 602 is interposed between the gate electrode G and a p-type region 603 in the semiconductor substrate 600.

When a positive voltage is applied to the gate electrode G, electrons are attracted to a boundary surface between the p-type region 603 in the semiconductor substrate 600 and the oxide insulating film 602, and the boundary surface is negatively charged. The place where the electrons are gathered has the electron density higher than the hole density and becomes n-type. This n-type portion serves as a current path and is called a channel 604. The channel 604 is an n-type channel in the example of FIG. 2. When the MOSFET is controlled to be turned on, the current flows through the channel 604 more than the parasitic diode formed in the p-type region 603.

Figure 3:
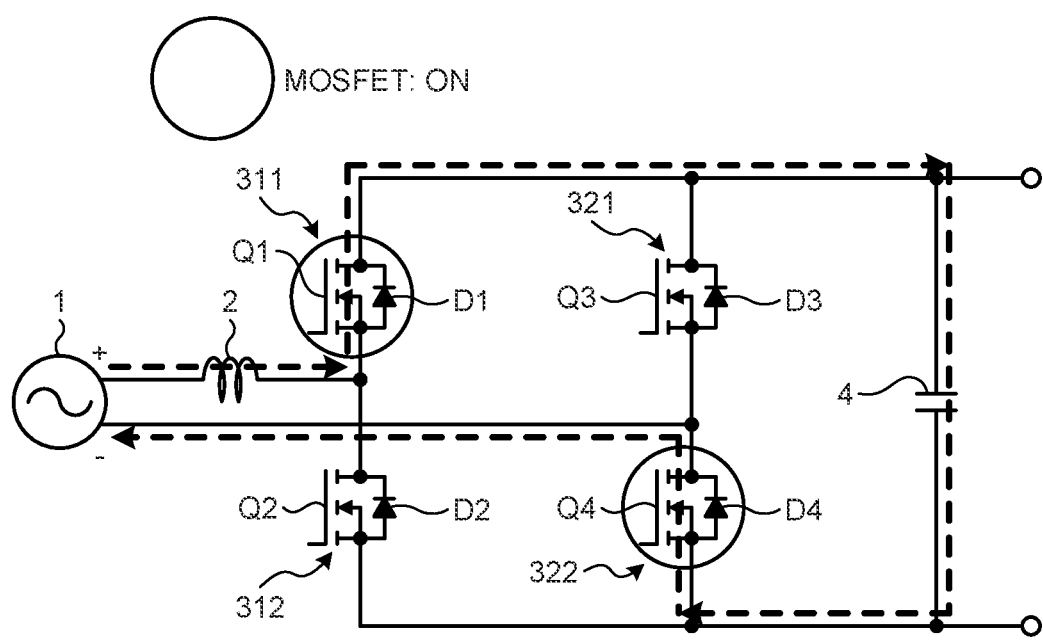
FIG. 3 is a first diagram illustrating a path of a current flowing through the converter in the first embodiment.

FIG. 3 is a first diagram illustrating a path of the current flowing through the converter 3 in the first embodiment. FIG. 3 illustrates a state in which the power supply voltage polarity is positive, and the absolute value of the detected value Is of the power supply current is larger than the current threshold. In this state, the first upper arm element 311 and the second lower arm element 322 are on, and the first lower arm element 312 and the second upper arm element 321 are off. At this time, the current flows through the alternating current power supply 1, the reactor 2, the switching element Q1, the smoothing capacitor 4, the switching element Q4, and the alternating current power supply 1 in this order. As described above, the first embodiment includes an operation mode in which the current is not caused to flow through the diode D1 and the diode D4, but is caused to flow through the channel of each of the switching elements Q1 and Q4. This operation is called "synchronous rectification". Note that in FIG. 3, the MOSFET that is on is indicated by a circle. Similar indication applies to the subsequent drawings as well. Details of the operation mode will be described later.

Figure 4:
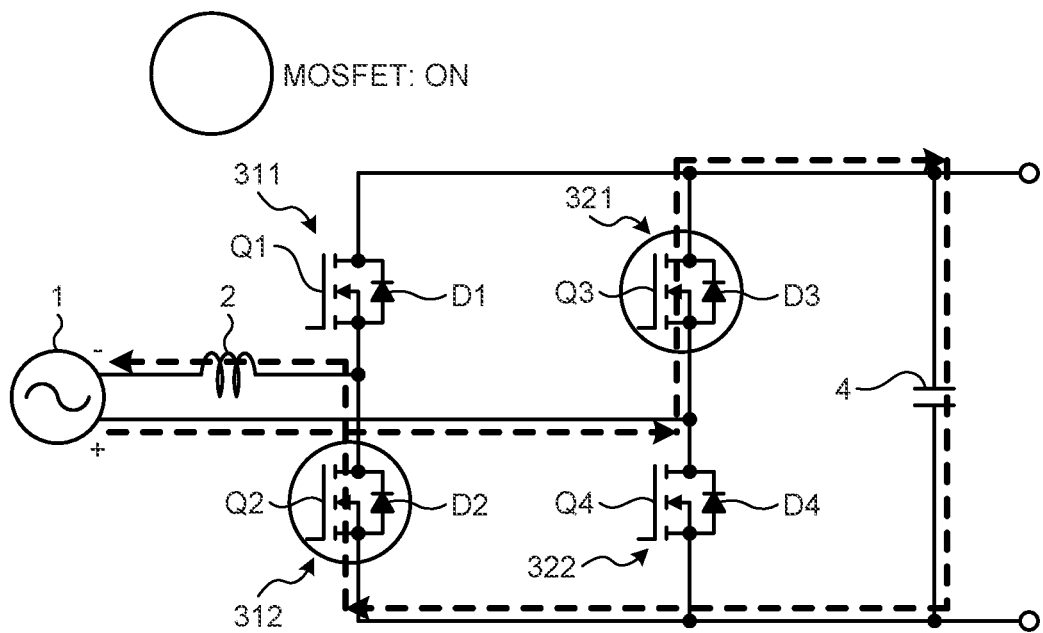
FIG. 4 is a second diagram illustrating a path of a current flowing through the converter in the first embodiment.

FIG. 4 is a second diagram illustrating a path of the current flowing through the converter 3 in the first embodiment. FIG. 4 illustrates a state in which the power supply voltage polarity is negative, and the absolute value of the detected value Is of the power supply current is larger than the current threshold. In this state, the first lower arm element 312 and the second upper arm element 321 are on, and the first upper arm element 311 and the second lower arm element 322 are off. At this time, the current flows through the alternating current power supply 1, the switching element Q3, the smoothing capacitor 4, the switching element Q2, the reactor 2, and the alternating current power supply 1 in this order. As described above, in the first embodiment, there is a case where a synchronous rectification operation is performed in which the current is not caused to flow through the diode D3 and the diode D2, but is caused to flow through the channel of each of the switching elements Q3 and Q2.

Figure 5:
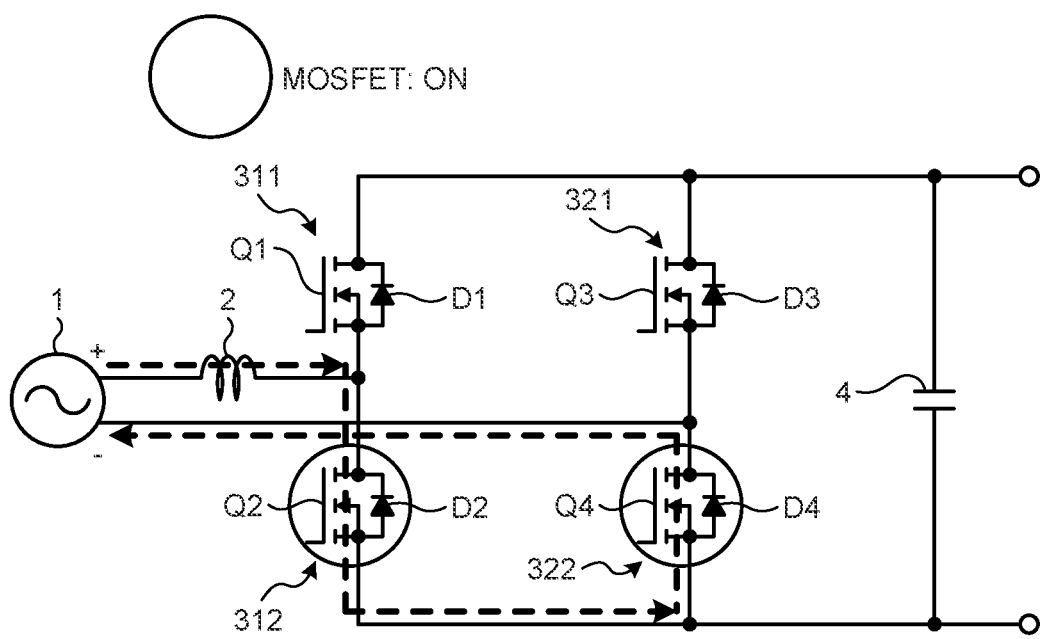
FIG. 5 is a third diagram illustrating a path of a current flowing through the converter in the first embodiment.

FIG. 5 is a third diagram illustrating a path of the current flowing through the converter 3 in the first embodiment. FIG. 5 illustrates a state in which the power supply voltage polarity is positive, and the absolute value of the detected value Is of the power supply current is larger than the current threshold. In this state, the first lower arm element 312 and the second lower arm element 322 are on, and the first upper arm element 311 and the second upper arm element 321 are off. At this time, the current flows through the alternating current power supply 1, the reactor 2, the switching element Q2, the switching element Q4, and the alternating current power supply 1 in this order. As a result, a power supply short-circuit path that does not pass through the smoothing capacitor 4 is formed. When the power supply short-circuit path illustrated in FIG. 5 is formed, the first lower arm element 312 needs to be turned on, but the second lower arm element 322 may be either turned on or turned off. As illustrated in FIG. 5, the first embodiment includes a mode in which the power supply short-circuit path is formed by causing the current to flow not through the diode D4 but through the channel of the switching element Q4.

Figures 6, 7:
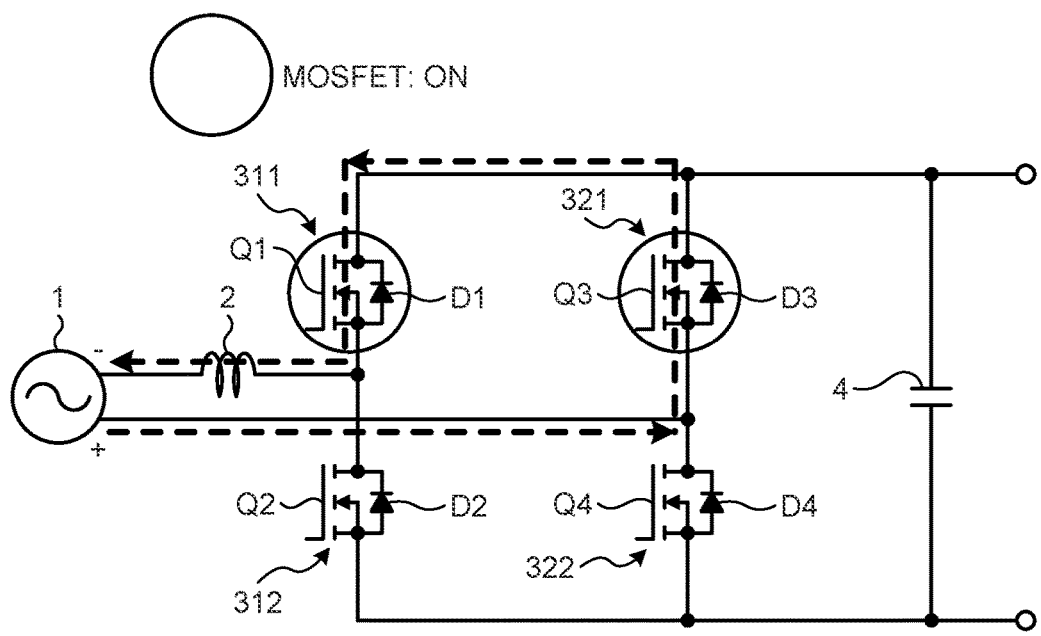
FIG. 6 is a fourth diagram illustrating a path of a current flowing through the converter in the first embodiment.
FIG. 7 is a table for explaining characteristics of operation modes in the first embodiment.

FIG. 6 is a fourth diagram illustrating a path of the current flowing through the converter 3 in the first embodiment. FIG. 6 illustrates a state in which the power supply voltage polarity is negative, and the absolute value of the detected value Is of the power supply current is larger than the current threshold. In this state, the first upper arm element 311 and the second upper arm element 321 are on, and the first lower arm element 312 and the second lower arm element 322 are off. At this time, the current flows through the alternating current power supply 1, the switching element Q3, the switching element Q1, the reactor 2, and the alternating current power supply 1 in this order. As a result, a power supply short-circuit path that does not pass through the smoothing capacitor 4 is formed. When the power supply short-circuit path illustrated in FIG. 6 is formed, the first upper arm element 311 needs to be turned on, but the second upper arm element 321 may be either turned on or turned off. As illustrated in FIG. 6, the first embodiment includes a mode in which the power supply short-circuit path is formed by causing the current to flow not through the diode D3 but through the channel of the switching element Q3.

The control unit 10 can control the values of the power supply current and the bus voltage by controlling the switching of the current path described above. When the power supply voltage polarity is positive, the motor drive apparatus 100 continuously switches between the operation illustrated in FIG. 3 and the operation illustrated in FIG. 5. When the power supply voltage polarity is negative, the motor drive apparatus 100 continuously switches between the operation illustrated in FIG. 4 and the operation illustrated in FIG. 6. As a result, it is possible to implement control for increasing the bus voltage, control for reducing an increase in the bus voltage, current control for improving the power factor and power supply harmonics, and the synchronous rectification for improving the operation efficiency.

Figure 8:
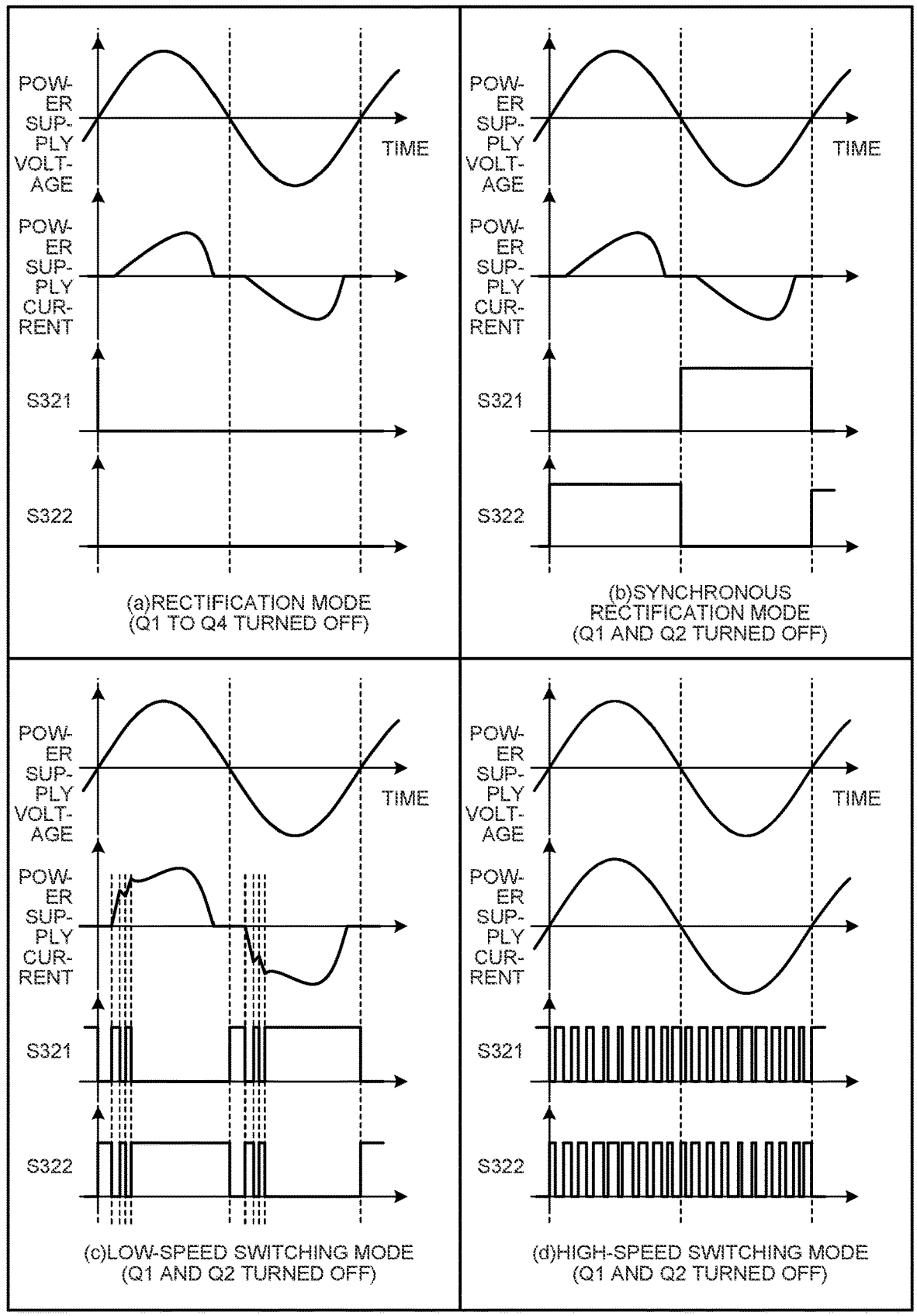
FIG. 8 is a set of graphs illustrating operating waveforms when the operation is performed in the operation modes illustrated in FIG. 7.

Next, operation modes used in the motor drive apparatus 100 of the first embodiment will be described with reference to FIGS. 7 and 8. FIG. 7 is a table for explaining characteristics of the operation modes in the first embodiment. FIG. 8 is a set of graphs illustrating operating waveforms when the operation is performed in the operation modes illustrated in FIG. 7.

FIG. 7 lists four operation modes being (a) rectification mode, (b) synchronous rectification mode, (c) low-speed switching mode, and (d) high-speed switching mode. The operation modes are classified by a combination of implementation and non-implementation of three controls being synchronous rectification, current control, and bus voltage control. The synchronous rectification is as described above, and is performed to improve the operation efficiency. The bus voltage control is control for reducing an increase in the bus voltage. The current control is control for improving the power factor of the current flowing in and out of the converter 3 and for suppressing harmonics. Note that the low-speed switching mode may be referred to as a "first switching mode", and the high-speed switching mode may be referred to as a "second switching mode".

The motor drive apparatus 100 of the first embodiment includes the rectification mode, and further includes at least one operation mode among the synchronous rectification mode, the low-speed switching mode, and the high-speed switching mode. Note that the low-speed switching mode and the high-speed switching mode are not necessarily needed in some cases in the application or product that does not require a boosting operation.

In FIG. 8, (a) illustrates operating waveforms when the operation is performed in the rectification mode. Specifically, from the top side, waveforms of the power supply voltage, the power supply current, the control signal S321 for controlling the switching element Q3, and the control signal S322 for controlling the switching element Q4 are illustrated. The other operation modes are illustrated similarly. In the rectification mode, the switching elements do not need to be controlled, so that there is an advantage that the consumption of the drive power for operating the gate drive circuit 15 can be kept down. Also, since the switching elements do not need to be controlled, there is an advantage that the control is easy.

In FIG. 8, (b) illustrates operating waveforms when the operation is performed in the synchronous rectification mode. The synchronous rectification mode is an operation mode that, at the time of passing the current through the parasitic diode, turns on the corresponding switching element and causes the current to flow to the channel side of the switching element. In the example of (b) in FIG. 8, the switching elements Q3 and Q4 are controlled to be turned on. The use of the synchronous rectification mode can achieve high efficiency particularly when the current flowing is small. Note that the synchronous rectification mode is implemented by merely changing the element through which the current flows from the parasitic diode to the switching element. Therefore, as illustrated in FIG. 7, the current control and the bus voltage control are not performed.

In FIG. 8, (c) illustrates operating waveforms when the operation is performed in the low-speed switching mode. The low-speed switching mode is an operation mode in which the power supply voltage is short-circuited via the reactor 2 once or more in a half cycle of the power supply voltage. In the example of (c) in FIG. 8, the short-circuit operation is performed twice every half cycle of the power supply voltage. By performing the short-circuit operation, energy is stored in the reactor 2. When the short-circuit operation is released after the energy is stored, the energy stored in the reactor 2 is transferred to and stored in the smoothing capacitor 4. As a result, the voltage of the smoothing capacitor 4, that is, the bus voltage, can be boosted.

The boosting amount of the bus voltage is adjusted by the bus voltage control. A proportional-integral controller or the like is used for the bus voltage control. In the bus voltage control, the operation of the converter 3 is controlled such that the detected value Vdc of the bus voltage approaches a target voltage. The bus voltage control also controls the short-circuit time when the power supply voltage is short-circuited via the reactor 2. Moreover, the bus voltage control changes the response time of the proportional-integral controller to be able to reduce an excessive increase in the bus voltage that can occur due to the occurrence of a load fluctuation.

The low-speed switching mode can pass a short-circuit current by the short-circuit operation. This can improve the power factor and prevent the harmonic current by increasing the width through which the power supply current flows. Regarding the improvement of the current waveform, a timing at which the short-circuit operation is performed may be determined in advance with reference to a zero cross point of the power supply voltage, and may be referred to according to the load. Alternatively, the power supply current may be detected, and the short-circuit time may be controlled such that the detected current waveform approaches a sine wave. Note that in the low-speed switching mode, the operation time for the short-circuit operation is short, so that generation of harmonic noise can be suppressed.

In FIG. 8, (d) illustrates operating waveforms when the operation is performed in the high-speed switching mode. The high-speed switching mode is an operation mode in which the power supply voltage is short-circuited a plurality of times via the reactor 2 across one cycle of the power supply voltage. The meaning of the short-circuit operation is the same as that in the low-speed switching mode. That is, energy is stored in the reactor 2 by performing the short-circuit operation, and the energy stored in the reactor 2 is transferred to the smoothing capacitor 4 by releasing the short-circuit operation after the energy is stored. As a result, the bus voltage can be boosted. The control of the boosting amount of the bus voltage can also be implemented by control similar to that for the low-speed switching mode.

As described above, the high-speed switching mode performs the short-circuit operation over the entire power supply voltage, and thus has a larger width through which the current flows than that in the low-speed switching mode. This can further improve the power factor and prevent the harmonic current as compared to the low-speed switching mode. Moreover, in the high-speed switching mode, the power factor can be controlled to a value close to one. As a result, the load can be driven to the limit of the breaker capacity particularly on a high-load side, and the power of the device can be increased.

Note that in the example of FIG. 8, the switching elements Q1 and Q2 are always turned off for simplification of description, but this is not a limitation. Except for the rectification mode, a synchronous rectification operation may be performed in which the switching element Q1 or the switching element Q2 is turned on at a timing when the current flows through the diode connected to each of the switching elements Q1 and Q2. Alternatively, the switching element Q1 or the switching element Q2 may be controlled to be on in a period in which the capacitor short circuit does not occur.

Moreover, a similar operation may be performed by stopping the operation of the switching element connected to each of the two diodes connected to the positive side of the smoothing capacitor 4, that is, the diode D1 in the first leg 31 and the diode D3 in the second leg 32. Alternatively, a similar operation may be performed by stopping the operation of the switching element connected to each of the two diodes connected to the negative side of the smoothing capacitor 4, that is, the diode D2 in the first leg 31 and the diode D4 in the second leg 32. Yet alternatively, a similar operation may be performed by stopping the operation of the switching element connected to each of the two diodes in the first leg 31, that is, the diodes D1 and D2. Still alternatively, a similar operation may be performed by stopping the operation of the switching element connected to each of the two diodes in the second leg 32, that is, the diodes D3 and D4.

Figure 9:
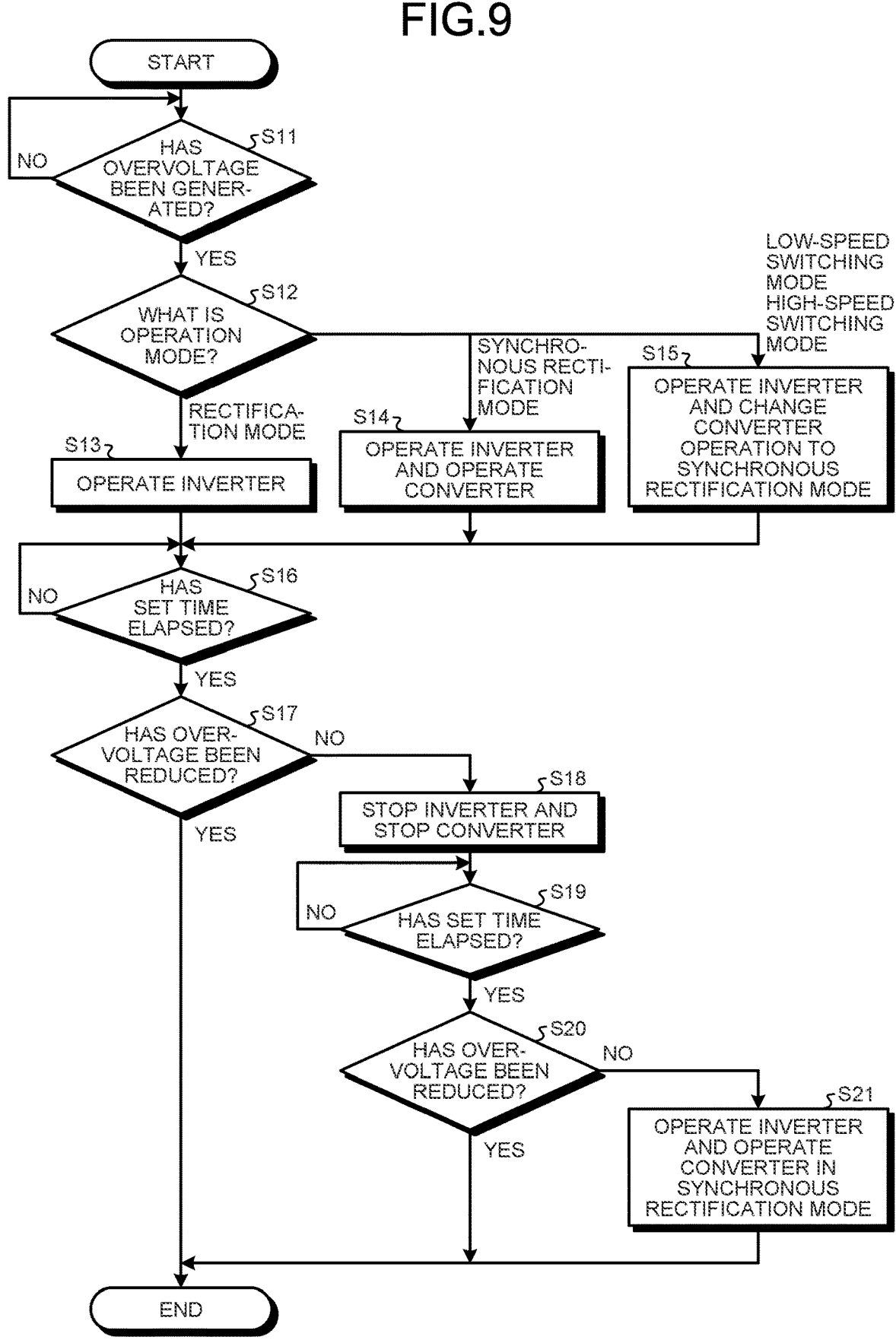
FIG. 9 is a first flowchart used to describe an operation of a main part in the first embodiment.

Next, the operation of the main part in the first embodiment will be described with reference to FIG. 9. FIG. 9 is a first flowchart used to describe the operation of the main part in the first embodiment. FIG. 9 illustrates a series of control flows for reducing an increase in the bus voltage due to a load fluctuation. The flowchart of FIG. 9 is executed during operation of the motor drive apparatus 100.

The control unit 10 monitors whether an overvoltage has been generated in the bus voltage on the basis of the detected value Vdc of the bus voltage (step S11). If no overvoltage has been generated in the bus voltage (No in step S11), the processing of step S11 is repeated. That is, the control unit 10 continues monitoring the bus voltage. If an overvoltage has been generated in the bus voltage (Yes in step S11), the processing proceeds to step S12.

The control unit 10 checks the current operation mode (step S12). If the operation mode is the rectification mode, the processing proceeds to step S13. If the operation mode is the synchronous rectification mode, the processing proceeds to step S14. If the operation mode is the low-speed switching mode or the high-speed switching mode, the processing proceeds to step S15.

If the operation mode is the rectification mode, the control unit 10 continues the operation of the inverter 18 (step S13). The reason why the operation of the inverter 18 is continued is that the rectification mode does not involve the switching operation, so that the power supply voltage is rectified as it is and stored in the smoothing capacitor 4.

If the operation mode is the synchronous rectification mode, the control unit 10 continues the operation of the inverter 18 and also continues the operation of the converter 3 (step S14). Although the synchronous rectification mode involves the switching operation, the power supply voltage is rectified and stored in the smoothing capacitor 4 as with diode rectification. Therefore, there is no problem with continuing the converter operation if no failure is found in the switching element. The operations of the inverter 18 and the converter 3 are thus continued.

If the operation mode is the low-speed switching mode or the high-speed switching mode, the control unit 10 continues the operation of the inverter 18 and changes the operation mode of the converter 3 to the synchronous rectification mode (step S15). The low-speed switching mode and the high-speed switching mode perform the short-circuit operation of the power supply voltage via the reactor 2, so that the energy stored in the reactor 2 flows into the smoothing capacitor 4. As a result, when a sudden load fluctuation occurs, the energy flowing into the smoothing capacitor 4 is not consumed by the load, and the bus voltage may become excessive. Therefore, the operation of the inverter 18 is continued, and the operation mode of the converter 3 is changed to the synchronous rectification mode. Note that the low-speed switching mode and the high-speed switching mode perform the bus voltage control by feedback control. In addition, the synchronous rectification mode does not involve a boosting operation. Therefore, when the load fluctuation is not a sudden one, the bus voltage can be reduced without any problem. Note that when the load fluctuation is a sudden one, the overvoltage of the smoothing capacitor 4 is suppressed by processing to be described later.

The control unit 10 measures the time after performing the processing of step S13, S14, or S15, and monitors whether or not the time after the processing has passed a set time (step S16). If the time after the processing has not passed the set time (No in step S16), the processing state of step S16 is continued. If the time after the processing has passed the set time (Yes in step S16), the processing proceeds to step S17.

The control unit 10 determines whether or not the excessive voltage has been successfully reduced, in other words, whether or not the state in which the bus voltage is excessive has been resolved, in the processing of step S13, S14, or S15 above (step S17). If the excessive voltage has been successfully reduced (Yes in step S17), the flow of FIG. 9 is terminated. If the excessive voltage has not been successfully reduced (No in step S17), the processing proceeds to step S18.

The control unit 10 stops the operations of the inverter 18 and the converter 3 (step S18). The operation of the inverter 18 is stopped because there is a possibility that a regenerative current from the inverter 18 flows into the smoothing capacitor 4. Therefore, the operation of the inverter 18 is stopped in the state where the operation of the converter 3 is stopped. Note that when the operation of the inverter 18 is stopped, it is desirable to consider a counter electromotive voltage generated in the motor 500. When the inverter 18 is stopped in a state where the rotational speed of the motor 500 is high, a large counter electromotive voltage is applied to the smoothing capacitor 4, and the voltage of the smoothing capacitor 4 may become excessive. In particular, when the motor 500 is operated by flux weakening control, the counter electromotive voltage of the motor 500 driven by the inverter 18 is higher than the bus voltage. It is thus desirable to stop the inverter 18 after decelerating the rotational speed of the motor to the speed at which the counter electromotive voltage is sufficiently smaller than the bus voltage. However, when the deceleration rate is excessively increased, the boosting rate of the bus voltage increases due to the regenerative current. Therefore, it is desirable to decrease the rotational speed of the motor 500 at the deceleration rate at which an excessive voltage is not generated in the smoothing capacitor 4. When the processing of step S18 ends, the processing proceeds to step S19.

The control unit 10 measures the time after performing the processing of step S18, and monitors whether or not the time after the processing has passed a set time (step S19). If the time after the processing has not passed the set time (No in step S19), the processing state of step S19 is continued. If the time after the processing has passed the set time (Yes in step S19), the processing proceeds to step S20.

The control unit 10 determines again whether or not the excessive voltage has been successfully reduced in the processing of step S18 (step S20). If the excessive voltage has been successfully reduced (Yes in step S20), the flow of FIG. 9 is terminated. If the excessive voltage has not been successfully reduced (No in step S20), the processing proceeds to step S21.

The control unit 10 operates the inverter 18 that is stopped to bring it into the operating state, and operates the converter 3 that is stopped in the synchronous rectification mode (step S21).

If the excessive voltage cannot be reduced by the processing so far, an excessive voltage may be applied from the alternating current power supply 1, or an excessive current may flow in from the alternating current power supply 1. Therefore, if the excessive voltage cannot be reduced, the inverter 18 is brought into the operating state again to operate so as to consume the energy stored in the smoothing capacitor 4. Note that although the operation mode of the converter 3 is the synchronous rectification mode in step S21, the converter 3 may be operated in the rectification mode. Furthermore, in a case where a breaker is included between the motor drive apparatus 100 and the alternating current power supply 1, the breaker may be controlled to be turned off so that the power supply voltage is not applied to the converter 3. In addition, in the flow of FIG. 9, the detected value Vs of the power supply voltage is not used for control. In a case where the detected value Vs of the power supply voltage is used for control, a part of the above processing may be omitted. Moreover, depending on the configuration of the converter 3 or the inverter 18, the order of the above processing may be changed, or a part thereof may be omitted.

Figure 10:
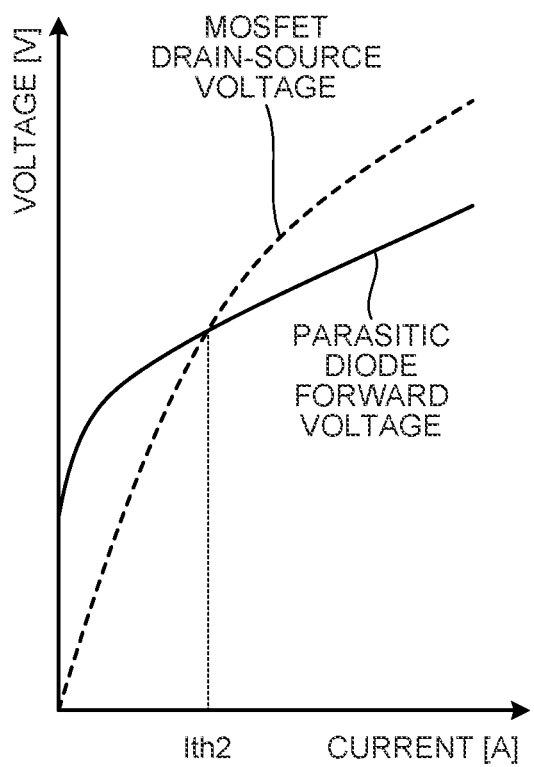
FIG. 10 is a graph illustrating a loss characteristic of the MOSFET used in the motor drive apparatus according to the first embodiment.

Next, a loss characteristic of the MOSFET used in the motor drive apparatus 100 will be described. FIG. 10 is a graph illustrating the loss characteristic of the MOSFET used in the motor drive apparatus 100 according to the first embodiment. In FIG. 10, the horizontal axis represents the current flowing through the MOSFET in an ON state and the current flowing through the parasitic diode. Moreover, the vertical axis represents the voltage required for passing the current to the switching element in the ON state and the voltage required for passing the current to the parasitic diode.

In FIG. 10, a solid line represents a parasitic diode forward voltage. The parasitic diode forward voltage is an example of a current-voltage characteristic representing a loss that occurs in the parasitic diode. Generally, when the current value is small, the diode requires a large voltage because of a large loss. However, when the current value is larger than a certain value, the rate of change in loss is improved, so that the slope of the current-voltage characteristic is relaxed. This characteristic appears in the waveform indicated by the solid line in FIG. 10.

Moreover, a broken line represents a MOSFET drain-source voltage that is a voltage between a drain and a source of the MOSFET. The MOSFET drain-source voltage is an example of a current-voltage characteristic representing the current flowing through the carrier of the switching element and the loss caused by the on-resistance of the switching element by the current flowing. In the switching element such as the MOSFET, the voltage required for passing the current increases in a quadratic curve manner with respect to the current value. This characteristic appears in the waveform indicated by the broken line in FIG. 10.

In FIG. 10, a cross point at which the solid line and the broken line intersect is a point at which the current flowing through the parasitic diode and the voltage required for passing that current are equal to the current flowing through the MOSFET and the voltage required for passing that current. In the first embodiment, a current value at the cross point at which the two current-voltage characteristics of the parasitic diode and the switching element intersect is referred to as a "second current threshold". Note that the current threshold described above, that is, the current threshold used for comparison with the absolute value of the detected value Is of the power supply current, is referred to as a "first current threshold". In FIG. 10, the second current threshold is represented by "Ith2". The second current threshold is a value larger than the first current threshold.

Figure 11:
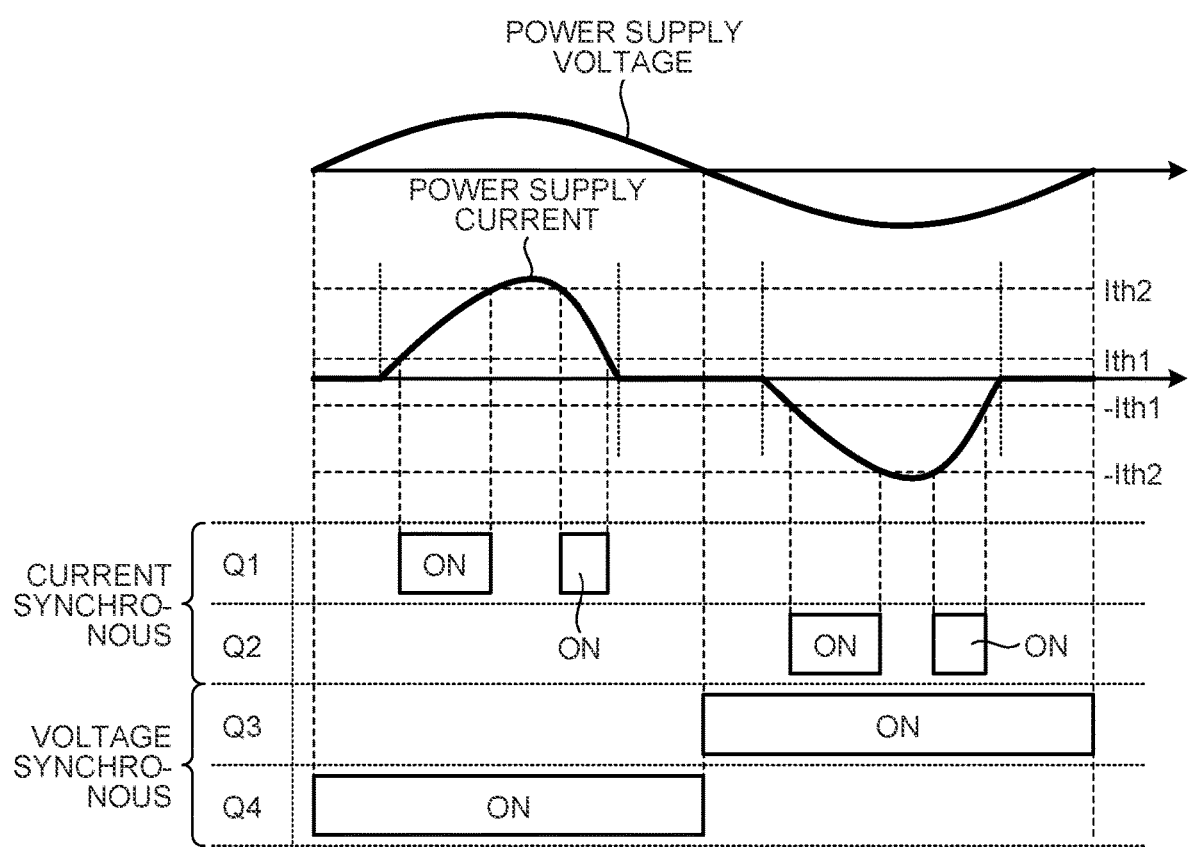
FIG. 11 is a diagram illustrating a timing at which a control unit turns on a switching element in the motor drive apparatus according to the first embodiment.

Next, a description will be made of the timing at which the control unit 10 turns on and off the switching element using the first current threshold and the second current threshold in the synchronous rectification mode. FIG. 11 is a diagram illustrating the timing at which the control unit 10 turns on the switching element in the motor drive apparatus 100 according to the first embodiment. In FIG. 11, the horizontal axis represents time. The upper part of FIG. 11 illustrates waveforms of the power supply voltage and the power supply current. The lower part of FIG. 11 illustrates that the switching elements Q1 and Q2 are current synchronous switching elements that are controlled to be turned on and off according to the polarity of the power supply current, and that the switching elements Q3 and Q4 are voltage synchronous switching elements that are controlled to be turned on and off according to the polarity of the power supply voltage. Along with the waveform of the power supply current, FIG. 11 illustrates values of the first current threshold Ith1 and the second current threshold Ith2. Note that although FIG. 11 illustrates one cycle of the alternating current power output from the alternating current power supply 1, the control unit 10 is assumed to perform control similar to the control illustrated in FIG. 11 in other cycles.

In a case where the power supply voltage polarity is positive, the control unit 10 turns on the switching element Q4 and turns off the switching element Q3. In a case where the power supply voltage polarity is negative, the control unit 10 turns on the switching element Q3 and turns off the switching element Q4. Note that in FIG. 11, the timing at which the switching element Q4 is turned from on to off coincides with the timing at which the switching element Q3 is turned from off to on, but the timing is not limited thereto. The control unit 10 may set a dead time in which both the switching elements Q3 and Q4 are turned off between the timing at which the switching element Q4 is turned from on to off and the timing at which the switching element Q3 is turned from off to on. Similarly, the control unit 10 may set a dead time in which both the switching elements Q3 and Q4 are turned off between the timing at which the switching element Q3 is turned from on to off and the timing at which the switching element Q4 is turned from off to on.

In the case where the power supply voltage polarity is positive, the control unit 10 turns on the switching element Q1 when the absolute value of the power supply current becomes greater than or equal to the first current threshold Ith1. Furthermore, when the absolute value of the power supply current exceeds the second current threshold Ith2, the switching element Q1 is turned off. After that, when the absolute value of the power supply current decreases and becomes less than or equal to the second current threshold Ith2, the control unit 10 turns on the switching element Q1. Furthermore, when the absolute value of the power supply current becomes smaller than the first current threshold Ith1, the switching element Q1 is turned off. In the case where the power supply voltage polarity is negative, the control unit 10 turns on the switching element Q2 when the absolute value of the power supply current becomes greater than or equal to the first current threshold Ith1. Furthermore, when the absolute value of the power supply current exceeds the second current threshold Ith2, the switching element Q2 is turned off. After that, when the absolute value of the power supply current decreases and becomes less than or equal to the second current threshold Ith2, the control unit 10 turns on the switching element Q2. Furthermore, when the absolute value of the power supply current becomes smaller than the first current threshold Ith1, the switching element Q2 is turned off.

In a case where the absolute value of the power supply current is less than or equal to the first current threshold Ith1, the control unit 10 performs control such that the switching elements Q1 and Q3 are not simultaneously turned on, and performs control such that the switching elements Q2 and Q4 are not simultaneously turned on. As a result, the control unit 10 can prevent a capacitor short circuit in the motor drive apparatus 100.

Under the control of the control unit 10 described above, the motor drive apparatus 100 can implement synchronous rectification by the switching elements Q1 and Q2 of the first leg 31. Specifically, when the absolute value of the power supply current is greater than or equal to the first current threshold Ith1 and less than or equal to the second current threshold Ith2, the control unit 10 causes the current to flow through the switching element Q1 or the switching element Q2 having a smaller loss in this range. Also, when the absolute value of the power supply current is greater than the second current threshold Ith2, the control unit 10 causes the current to flow through the diode D1 or the diode D2 having a smaller loss in this range. Therefore, the motor drive apparatus 100 can cause the current to flow through the element having a small loss according to the current value, and thus can be a highly efficient apparatus in which a decrease in efficiency is prevented and the loss is reduced.

Note that the control unit 10 may perform the boosting operation by performing switching control to turn on and off the switching elements Q1 and Q2 complementarily in the period in which the switching element Q1 is turned on. Similarly, the control unit 10 may perform the boosting operation by performing switching control to turn on and off the switching elements Q1 and Q2 complementarily in the period in which the switching element Q2 is turned on.

That is, when the absolute value of the power supply current is greater than or equal to the first current threshold Ith1 and less than or equal to the second current threshold Ith2, the control unit 10 allows turning on of one of the switching elements Q1 and Q2 included in the first leg 31 being one of the first leg 31 and the second leg 32 according to the polarity of the power supply current. Also, when the absolute value of the power supply current is less than the first current threshold Ith1 or greater than the second current threshold Ith2, the control unit 10 prohibits turning on of one of the switching elements Q1 and Q2 that is the same as that described above.

Specifically, when the polarity of the power supply current is positive, and the absolute value of the power supply current is greater than or equal to the first current threshold Ith1 and less than or equal to the second current threshold Ith2, the control unit 10 allows the switching element Q1 to be turned on. When the absolute value of the power supply current is less than the first current threshold Ith1 or greater than the second current threshold Ith2, the control unit 10 prohibits the switching element Q1 from being turned on. When the polarity of the power supply current is positive, and the absolute value of the power supply current is greater than or equal to the first current threshold Ith1 and less than or equal to the second current threshold Ith2, the control unit 10 turns on the switching element Q2 in the period in which the switching element Q1 is turned off. When the absolute value of the power supply current is less than the first current threshold Ith1 or greater than the second current threshold Ith2, the control unit 10 prohibits the switching element Q2 from being turned on as well.

Moreover, when the polarity of the power supply current is negative, and the absolute value of the power supply current is greater than or equal to the first current threshold Ith1 and less than or equal to the second current threshold Ith2, the control unit 10 allows the switching element Q2 to be turned on. When the absolute value of the power supply current is less than the first current threshold Ith1 or greater than the second current threshold Ith2, the control unit 10 prohibits the switching element Q2 from being turned on. Also, when the polarity of the power supply current is negative, and the absolute value of the power supply current is greater than or equal to the first current threshold Ith1 and less than or equal to the second current threshold Ith2, the control unit 10 turns on the switching element Q1 in the period in which the switching element Q2 is turned off. When the absolute value of the power supply current is less than the first current threshold Ith1 or greater than the second current threshold Ith2, the control unit 10 prohibits the switching element Q1 from being turned on as well.

As described above, the control unit 10 allows the switching element to be turned on in the range where the absolute value of the power supply current is greater than or equal to the first current threshold Ith1 and the loss of the switching element is smaller than the loss of the parasitic diode. In addition, the control unit 10 prohibits the switching element from being turned on in the range where the loss of the switching element is larger than the loss of the parasitic diode.

Note that in the example of FIG. 11, the control unit 10 controls the switching elements Q3 and Q4 to be turned on and off according to the polarity of the power supply voltage and controls the switching elements Q1 and Q2 to be turned on and off according to the polarity of the power supply current, but this is not a limitation. The control unit 10 may control the switching elements Q1 and Q2 to be turned on and off according to the polarity of the power supply voltage, and may control the switching elements Q3 and Q4 to be turned on and off according to the polarity of the power supply current.

Moreover, as described above, the second current threshold Ith2 is the current value when the voltages required for passing the current to the parasitic diode and the switching element have the same value, but is not limited thereto. The second current threshold Ith2 may be a value determined according to the characteristic of the voltage required for passing the current to the parasitic diode and the characteristic of the voltage required for passing the current to the switching element.

For example, the second current threshold Ith2 may be a value obtained by increasing, according to a switching loss generated in the switching element, the current value when the voltages required for passing the current to the parasitic diode and the switching element have the same value. As a result, it is possible to determine the second current threshold Ith2 in consideration of the switching loss generated when the switching element is switched from on to off. In this case, the control unit 10 keeps the switching element on when a reduction in loss cannot be expected by turning off the switching element even when the absolute value of the power supply current further increases in a state where the switching element is turned on. As a result, the motor drive apparatus 100 can further prevent a decrease in efficiency.

Moreover, the second current threshold Ith2 may be a value obtained by adding or subtracting a prescribed value to or from the current value when the voltages required for passing the current to the parasitic diode and the switching element have the same value. As a result, it is possible to determine the second current threshold Ith2 in consideration of a difference in the characteristics due to component variations of each element. In this case, there is a possibility that the control unit 10 cannot improve the reduction in loss as compared to the case where the second current threshold Ith2 is the current value when the voltages required for passing the current to the parasitic diode and the switching element have the same value. However, the control unit 10 can reduce the loss as compared to the case where the switching element is continuously turned on even when the absolute value of the power supply current further increases in the state where the switching element is turned on.

Figure 12:
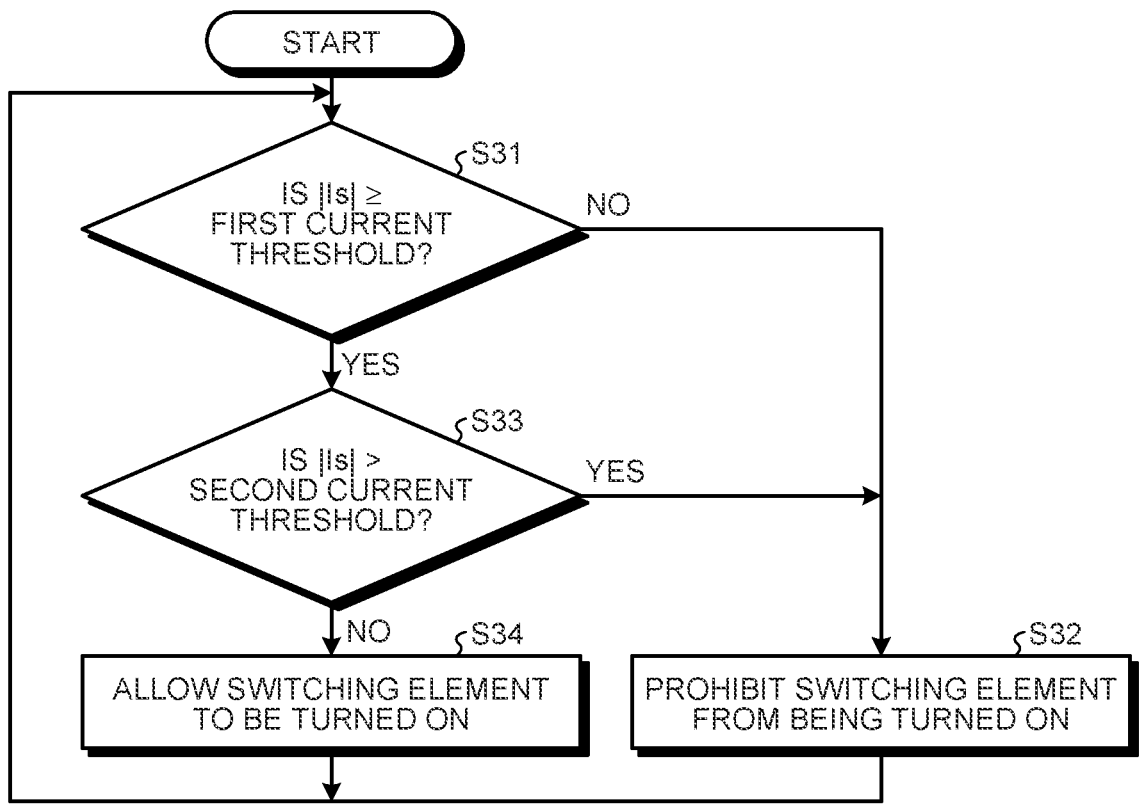
FIG. 12 is a second flowchart used to describe an operation of the main part in the first embodiment.

FIG. 12 is a second flowchart used to describe an operation of the main part in the first embodiment. FIG. 12 illustrates a processing flow in which the control unit 10 of the motor drive apparatus 100 performs on/off control on the switching elements Q1 and Q2. Note that here, as an example, a case where the polarity of the power supply current is positive will be described.

The control unit 10 compares an absolute value |Is| of the detected value Is of the power supply current with the first current threshold (step S31). If the absolute value |Is| is less than the first current threshold (No in step S31), the control unit 10 prohibits the switching element Q1 from being turned on (step S32). If the absolute value |Is| is greater than or equal to the first current threshold (Yes in step S31), the control unit 10 compares the absolute value |Is| with the second current threshold (step S33). If the absolute value |Is| is less than or equal to the second current threshold (No in step S33), the control unit 10 allows the switching element Q1 to be turned on (step S34). If the absolute value |Is| is greater than the second current threshold (Yes in step S33), the control unit 10 prohibits the switching element Q1 from being turned on (step S32). After step S32 or step S34, the control unit 10 returns to step S31 and repeats the above processing. When the polarity of the power supply current is negative, the control unit 10 performs processing similar to that described above on the switching element Q2.

Note that in step S31 above, the case where the absolute value |Is| is equal to the first current threshold is determined to be "Yes", but may be determined to be "No". That is, the case where the absolute value |Is| is equal to the first current threshold may be determined to be either "Yes" or "No". Also, in step S33 above, the case where the absolute value |Is| is equal to the second current threshold is determined to be "No", but may be determined to be "Yes". That is, the case where the absolute value |Is| is equal to the second current threshold may be determined to be either "Yes" or "No".

Next, a configuration of the switching element will be described. In the motor drive apparatus 100, one method of increasing the switching speed of the switching element is a method of decreasing the gate resistance of the switching element. As the gate resistance decreases, the charge/discharge time to the gate input capacitance decreases, which shortens the turn-on period and the turn-off period, so that the switching speed increases.

However, there is a limit to reducing the switching loss by decreasing the gate resistance. Therefore, the switching element is for example formed of a WBG semiconductor such as GaN or SiC. By using the WBG semiconductor for the switching element, the loss per switching can be further reduced; therefore, the efficiency is further improved and high-frequency switching can be performed. Moreover, the reactor 2 can be downsized by enabling the high-frequency switching, so that the motor drive apparatus 100 can be reduced in size and weight. In addition, the use of the WBG semiconductor for the switching element improves the switching speed and reduces the switching loss. As a result, it is possible to simplify heat dissipation measures that enable the switching element to continue normal operation. Moreover, the use of the WBG semiconductor for the switching element can set the switching frequency to a sufficiently high value such as 16 kHz or higher. As a result, noise caused by switching can be prevented or reduced.

Moreover, in the GaN semiconductor, a two-dimensional electron gas is generated at an interface between a GaN layer and an aluminum gallium nitride layer, and the carrier mobility is high due to the two-dimensional electron gas. Therefore, the switching element using the GaN semiconductor can achieve high-speed switching. Here, in a case where the alternating current power supply 1 is a commercial power supply of 50 Hz or 60 Hz, the audible range frequency is in a range from 16 kHz to 20 kHz, that is, in a range from 266 times to 400 times the frequency of the commercial power supply. The GaN semiconductor is suitable for switching at a frequency higher than this audible range frequency. In a case where the switching elements Q1 to Q4 made of silicon (Si), which is a mainstream semiconductor material, are driven at a switching frequency of several tens of kHz or higher, the ratio of the switching loss increases, so that heat dissipation measures are essential. On the other hand, the switching elements Q1 to Q4 made of the GaN semiconductors have a very small switching loss even when driven at a switching frequency of several tens of kHz or higher, specifically, at a switching frequency higher than 20 kHz. Therefore, it is not necessary to take heat dissipation measures, or a heat dissipation member used for the heat dissipation measures can be reduced in size, whereby the motor drive apparatus 100 can be reduced in size and weight. In addition, the reactor 2 can be downsized by enabling high-frequency switching. Note that in order to prevent a primary component of the switching frequency from entering a measurement range of the conducted emission standard, the switching frequency is preferably 150 kHz or lower.

Moreover, the WBG semiconductor has a smaller capacitance than the Si semiconductor and thus has less recovery current generated due to switching, thereby being able to prevent or reduce the generation of loss and noise due to the recovery current. Therefore, the WBG semiconductor is suitable for high-frequency switching.

Note that the SiC semiconductor has smaller on-resistance than the GaN semiconductor. Therefore, the first upper arm element 311 and the first lower arm element 312 of the first leg 31 having a larger number of switching operations than the second leg 32 may be made of the GaN semiconductor, and the second upper arm element 321 and the second lower arm element 322 of the second leg 32 having a smaller number of switching operations may be made of the SiC semiconductor. This makes it possible to make the most of the characteristics of each of the SiC semiconductor and the GaN semiconductor. In addition, by using the SiC semiconductor for the second upper arm element 321 and the second lower arm element 322 of the second leg 32 having a smaller number of switching operations than the first leg 31, the proportion occupied by the conduction loss among the losses of the second upper arm element 321 and the second lower arm element 322 increases, and the turn-on loss and the turn-off loss are reduced. Therefore, an increase in heat generation due to switching of the second upper arm element 321 and the second lower arm element 322 is prevented, and the chip areas of the second upper arm element 321 and the second lower arm element 322 included in the second leg 32 can be relatively reduced. This makes it possible to effectively utilize the SiC semiconductor having a low yield at the time of manufacturing a chip.

Moreover, the SJ-MOSFET having the super junction structure may be used for the second upper arm element 321 and the second lower arm element 322 of the second leg 32 having a small number of switching operations. The use of the SJ-MOSFET can avoid a disadvantage that the capacitance is high and recovery is likely to occur while making use of low on-resistance which is an advantage of the SJ-MOSFET. The use of the SJ-MOSFET can also reduce the manufacturing cost of the second leg 32 as compared to the case of using the WBG semiconductor.

Moreover, the WBG semiconductor has higher heat resistance than the Si semiconductor and can operate even when the junction temperature is high. Therefore, by using the WBG semiconductor, the first leg 31 and the second leg 32 can be formed by a small chip having a high thermal resistance. In particular, the SiC semiconductor having a low yield at the time of manufacturing a chip can achieve cost reduction when used for a small chip.

Moreover, the WBG semiconductor can prevent an increase in loss generated in the switching element even when driven at a high frequency of about 100 kHz, so that an effect of loss reduction due to downsizing of the reactor 2 increases and that a highly efficient converter can be implemented in a wide output band, that is, under wide load conditions.

Moreover, the WBG semiconductor has higher heat resistance than the Si semiconductor and has a high tolerance level for heat generation associated with switching due to unevenness of loss between the arms, and is thus suitable for the first leg 31 in which switching loss due to high-frequency driving occurs.

As described above, according to the first embodiment, the control unit has the plurality of operation modes for controlling conduction of the switching elements of the converter to operate the converter in different modes of operation. When the bus voltage indicates an excessive value, the control unit changes the operation of at least one of the switching elements of the converter and the inverter depending on the operation mode. As a result, an increase in the bus voltage due to the load fluctuation can be reduced.

Moreover, the first embodiment includes the plurality of operation modes for operating the switching elements of the converter, and a protection operation suitable for each operation mode is selected when an excessive voltage is generated. As a result, the converter and the inverter can be reliably protected from an excessive voltage, and a more reliable motor drive apparatus can be obtained.

Moreover, according to the first embodiment, when the bus voltage indicates an excessive value while the converter operates in the low-speed switching mode or the high-speed switching mode, the control unit changes the operation mode to the synchronous rectification mode. The synchronous rectification mode does not involve a boosting operation. Therefore, when the load fluctuation is not a sudden one, the bus voltage can be reduced by changing the operation mode to the synchronous rectification mode.

Moreover, according to the first embodiment, when the state in which the bus voltage is excessive is not resolved even by changing the operation mode to the synchronous rectification mode, the control unit stops the operations of the converter and the inverter. When the state in which the bus voltage is excessive is caused by the regenerative current from the inverter, the bus voltage can be reduced by stopping the operation of the inverter. Note that in order to quickly determine whether or not the state in which the bus voltage is excessive is caused by the regenerative current from the inverter, it is preferable to stop the operation of the converter.

Moreover, according to the first embodiment, when the state in which the bus voltage is excessive is not resolved even by stopping the operation of the inverter, the control unit causes the inverter to operate again. When the state in which the bus voltage is excessive is not resolved even by stopping the operation of the inverter, an excessive voltage may be applied from the alternating current power supply, or an excessive current may flow in from the alternating current power supply. Since the inverter is not in a regenerative state, the energy stored in the smoothing capacitor can be consumed by operating the inverter again. Note that when it is clear that the cause of the bus voltage being excessive is an excessive voltage or an excessive current from the alternating current power supply, it is preferable to stop the operation of the converter.

Moreover, according to the first embodiment, when the absolute value of the power supply current is greater than or equal to the first current threshold and less than or equal to the second current threshold, the control unit allows the switching element having a smaller loss than the parasitic diode in this range to be turned on. Also, when the absolute value of the power supply current is greater than the second current threshold, the control unit 10 prohibits the switching element having a larger loss than the parasitic diode in this range from being turned on. As a result, in the converter, the current can flow through the element having a small loss according to the current value. This makes it possible to obtain a highly efficient motor drive apparatus in which a decrease in efficiency and the loss are reduced.

Figure 13:
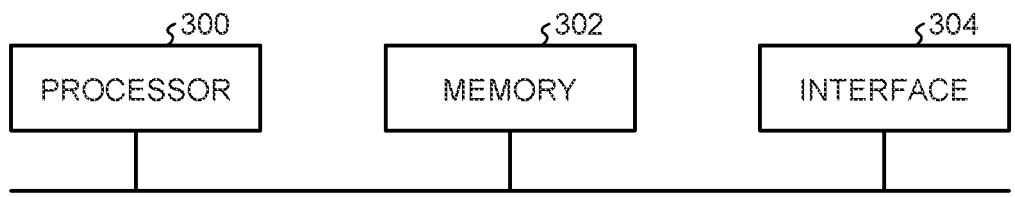
FIG. 13 is a block diagram illustrating an example of a hardware configuration that implements the function of the control unit in the first embodiment.
Figure 14:
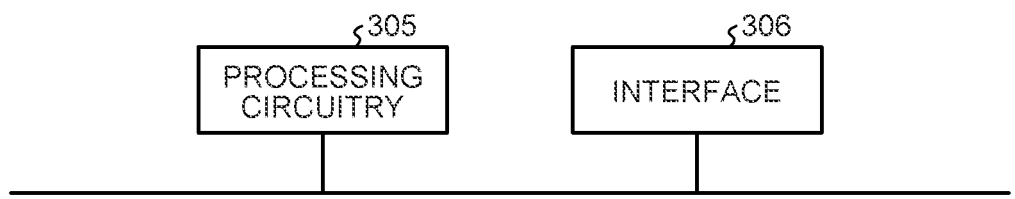
FIG. 14 is a block diagram illustrating another example of the hardware configuration that implements the function of the control unit in the first embodiment.

Next, a hardware configuration for implementing the functions of the control unit 10 in the first embodiment will be described with reference to FIGS. 13 and 14. FIG. 13 is a block diagram illustrating an example of the hardware configuration that implements the functions of the control unit 10 in the first embodiment. FIG. 14 is a block diagram illustrating another example of the hardware configuration that implements the functions of the control unit 10 in the first embodiment.

When the functions of the control unit 10 in the first embodiment are implemented, as illustrated in FIG. 13, a processor 300 that performs an arithmetic operation, a memory 302 that saves programs to be read by the processor 300, and an interface 304 that inputs and outputs signals can be included.

The processor 300 may be arithmetic means such as an arithmetic unit, a microprocessor, a microcomputer, a central processing unit (CPU), or a digital signal processor (DSP). Examples of the memory 302 can include a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, and a digital versatile disc (DVD).

The memory 302 stores programs for executing the functions of the control unit 10 in the first embodiment. The processor 300 transmits and receives necessary information via the interface 304, executes the programs stored in the memory 302, and refers to a table stored in the memory 302, thereby being able to perform the processing described above. A result of arithmetic operation by the processor 300 can be stored in the memory 302.

Moreover, when the functions of the control unit 10 in the first embodiment are implemented, processing circuitry 305 illustrated in FIG. 14 can also be used. The processing circuitry 305 corresponds to a single circuit, a complex circuit, an application specific integrated circuit (ASIC), a field programmable gate array (FPGA), or a combination of those. Information to be input to the processing circuitry 305 and information to be output from the processing circuitry 305 can be obtained via an interface 306. Note that even in the configuration using the processing circuitry 305, some processing in the control unit 10 may be performed by the processor 300 in the configuration illustrated in FIG. 13.

Second Embodiment

Figure 15:
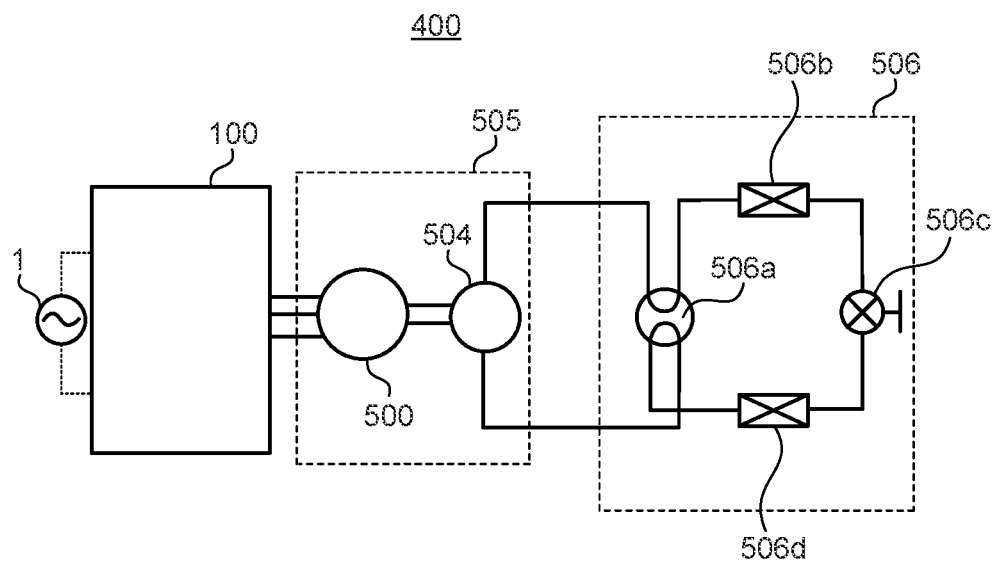
FIG. 15 is a diagram illustrating a configuration of an air conditioner according to a second embodiment.

A second embodiment will describe an example of application of the motor drive apparatus 100 described in the first embodiment. FIG. 15 is a diagram illustrating a configuration of an air conditioner 400 according to the second embodiment. The motor drive apparatus 100 described in the first embodiment can be applied to products such as a blower, a compressor, and an air conditioner. In the second embodiment, an example in which the motor drive apparatus 100 is applied to the air conditioner 400 will be described as an example of application of the motor drive apparatus 100 according to the first embodiment.

In FIG. 15, the motor 500 is connected to an output side of the motor drive apparatus 100, and the motor 500 is coupled to a compression element 504. A compressor 505 includes the motor 500 and the compression element 504. A refrigeration cycle unit 506 includes a four-way valve 506a, an indoor heat exchanger 506b, an expansion valve 506c, and an outdoor heat exchanger 506d.

A passage of the refrigerant circulating in the air conditioner 400 is formed such that it starts from the compression element 504 and returns to the compression element 504 via the four-way valve 506a, the indoor heat exchanger 506b, the expansion valve 506c, and the outdoor heat exchanger 506d, and again via the four-way valve 506a.

The motor drive apparatus 100 receives supply of alternating current power from the alternating current power supply 1 and causes the motor 500 to rotate. By the rotation of the motor 500, the compression element 504 can execute a refrigerant compression operation and cause the refrigerant to circulate in the refrigeration cycle unit 506.

When the motor drive apparatus 100 according to the first embodiment is applied to products such as a blower, a compressor, and an air conditioner, the motor 500 is driven in a wide range from a low speed region to a high speed region by the motor drive apparatus 100. At this time, the bus voltage required for controlling the converter 3 changes according to an operation state of the motor 500. In general, the higher the rotational speed of the motor 500, the higher the output voltage of the inverter 18 needs to be. The upper limit of the output voltage of the inverter 18 is limited by the input voltage to the inverter 18, that is, the bus voltage being the output of the motor drive apparatus 100. A region where the output voltage from the inverter 18 is saturated beyond the upper limit limited by the bus voltage is called an overmodulation region.

In such a motor drive apparatus 100, the bus voltage does not need to be boosted in a range where the motor 500 rotates at a low speed, that is, in a range not reaching the overmodulation region. On the other hand, when the motor 500 rotates at a high speed, the overmodulation region can be set to a higher speed side by boosting the bus voltage. As a result, the operation range of the motor 500 can be expanded to the high speed side. In particular, when the control is performed on the high speed side, the counter electromotive voltage generated by the rotation of the motor 500 is higher than the bus voltage. Thus, when the operation of the inverter 18 is suddenly stopped or when the rotational speed of the motor 500 is suddenly decreased by the inverter 18, the bus voltage increases and possibly exceeds the withstand voltage of the components included in the motor drive apparatus 100. From this point of view, the application of the method described in the first embodiment can protect the motor drive apparatus 100 from an excessive voltage.

Moreover, if the operation range of the motor 500 does not need to be expanded, the number of turns of a winding for a stator included in the motor 500 can be increased accordingly. By increasing the number of turns of the winding, the motor voltage generated across the winding increases in the low speed region, and the current flowing through the winding decreases accordingly. As a result, the loss caused by the switching operation of the switching elements in the inverter 18 can be reduced. The number of turns of the winding of the motor 500 is set to an appropriate value in order to obtain the effects of both the expansion of the operation range of the motor 500 and the improvement of the loss in the low speed region.

On the other hand, when the number of turns of the winding of the motor 500 is increased, the counter electromotive voltage per rotation increases, so that an excessive voltage is more likely to be generated when a comparison is made with the same rotational speed. Accordingly, the counter electromotive voltage generated by the rotation of the motor 500 is likely to be higher than the bus voltage. Thus, when the operation of the inverter 18 is suddenly stopped or when the rotational speed of the motor 500 is suddenly decreased by the inverter 18, the bus voltage increases and possibly exceeds the withstand voltage of the components included in the motor drive apparatus 100. From this point of view, the application of the method described in the first embodiment can protect the motor drive apparatus 100 from an excessive voltage.

Note that the configurations illustrated in the aforementioned embodiments merely illustrate examples of the content of the present invention, and can thus be combined with another known technique or partially omitted and/or modified without departing from the scope of the present invention.

The invention claimed is:

1. A motor drive apparatus comprising:
a reactor;
a converter including four unidirectional elements that are bridge-connected, the converter being connected to an alternating current power supply via the reactor;
a smoothing capacitor connected between output terminals of the converter;
an inverter converting a direct current voltage output from the smoothing capacitor into an alternating current voltage to be applied to a motor, and outputting the alternating current voltage; and
a physical quantity detection unit detecting a physical quantity representing an operating state on an output side of the converter, wherein
in the converter, two of the four unidirectional elements are connected in series and form a first leg, and remaining two of the unidirectional elements are connected in series and form a second leg,
a switching element is connected in parallel to at least each of two unidirectional elements in the first and second legs connected to a positive side of the smoothing capacitor, two unidirectional elements in the first and second legs connected to a negative side of the smoothing capacitor, the two unidirectional elements in the first leg, or the two unidirectional elements in the second leg,
a plurality of operation modes are included in which conduction of the switching element is controlled such that the converter is operated in different modes of operation,
a synchronous rectification mode of causing, at a timing when a current is caused to flow through the unidirectional element, the current to flow through a channel of a corresponding switching element is included as the operation mode,
at least one of a first switching mode and a second switching mode is included as the operation mode, the first switching mode short-circuiting a power supply voltage, which is a voltage of the alternating current power supply, via the reactor at least once in a half cycle of the power supply voltage, and the second switching mode short-circuiting the power supply voltage a plurality of times via the reactor across one cycle of the power supply voltage,
the operation mode is changed to the synchronous rectification mode when the physical quantity indicates an excessive value during operation in the first switching mode or the second switching mode, and
the operation of the inverter is stopped when a state in which the physical quantity is excessive is not resolved even by changing the operation mode to the synchronous rectification mode.

2. The motor drive apparatus according to claim 1, wherein
the inverter is caused to operate when the state in which the physical quantity is excessive is not resolved even by stopping the operation of the inverter.

3. The motor drive apparatus according to claim 1, wherein
the switching element is a metal oxide semiconductor field effect transistor formed of a wide band gap semiconductor.

4. The motor drive apparatus according to claim 3, wherein
the wide band gap semiconductor is silicon carbide, gallium nitride, gallium oxide, or diamond.

5. The motor drive apparatus according to claim 3, wherein
the unidirectional element is a parasitic diode of the metal oxide semiconductor field effect transistor.

6. The motor drive apparatus according to claim 1, wherein
the switching element is a metal oxide semiconductor field effect transistor having a super junction structure.

7. The motor drive apparatus according to claim 6, wherein
the unidirectional element is a parasitic diode of the metal oxide semiconductor field effect transistor.

8. The motor drive apparatus according to claim 1, wherein
the unidirectional element is a diode.

9. A blower comprising
the motor drive apparatus according to claim 1.

10. An air conditioner comprising
the blower according to claim 9.

11. A compressor comprising
the motor drive apparatus according to claim 1.

12. An air conditioner comprising
the compressor according to claim 11.

* * * * *